US012372926B2

(12) United States Patent
Peters et al.

(10) Patent No.: US 12,372,926 B2
(45) Date of Patent: Jul. 29, 2025

(54) MINIATURE USER-POWERED LIGHTING DEVICE, SYSTEM AND METHOD OF USING SAME

(71) Applicant: Preciflex SA, Neuchâtel (CH)

(72) Inventors: Allen Peters, Neuchâtel (CH); Xavier Clement, Fournets Luisans (FR)

(73) Assignee: PRECIFLEX SA, Neuchâtel (CH)

( * ) Notice: Subject to any disclaimer, the term of this patent is extended or adjusted under 35 U.S.C. 154(b) by 0 days.

(21) Appl. No.: 16/231,647

(22) Filed: Dec. 24, 2018

(65) Prior Publication Data

US 2019/0137935 A1 May 9, 2019

Related U.S. Application Data

(62) Division of application No. 15/555,981, filed as application No. PCT/IB2016/000249 on Mar. 7, 2016, now Pat. No. 10,254,715.

(Continued)

(51) Int. Cl.
*H05B 45/42* (2020.01)
*F21V 33/00* (2006.01)
(Continued)

(52) U.S. Cl.
CPC .......... *G04B 47/04* (2013.01); *F21V 33/0004* (2013.01); *G04B 19/30* (2013.01);
(Continued)

(58) Field of Classification Search
CPC ........ G04C 10/00; G04B 19/30; G04B 47/04; G04B 19/32; G04B 47/042; F21V 33/0004
See application file for complete search history.

(56) References Cited

U.S. PATENT DOCUMENTS 1,384,636 A * 7/1921 Sachse .................... F21L 13/08 310/75 A
3,689,758 A * 9/1972 Power ................ A44C 15/0015 362/104
(Continued)

FOREIGN PATENT DOCUMENTS

CN 1347521 A 6/2002
CN 201035340 3/2008
(Continued)

OTHER PUBLICATIONS

Eton user manaul—2013.*
International Search Report, International patent application No. PCT/IB2016/000249; Aug. 16, 2016.

*Primary Examiner* — Edwin A. Leon
*Assistant Examiner* — Kevin Andrew Johnston
(74) *Attorney, Agent, or Firm* — DA VINCI PARTNERS LLC; John Moetteli

(57) ABSTRACT

A miniature, self-powered, user-powered lighting device, employing mechanical energy storage and incorporating miniature lighting elements which are illuminated on-demand for a limited duration for backlighting or illumination purposes without the need for a battery or other electrochemical storage device. The device comprising a manual spring loading mechanism, a spiral spring, a manual trigger mechanism, a transmission for increasing the rotational speed, a miniature generator, and at least one light source.

20 Claims, 6 Drawing Sheets

Related U.S. Application Data

(60) Provisional application No. 62/129,154, filed on Mar. 6, 2015.

(51) Int. Cl.
*G04B 19/30* (2006.01)
*G04B 19/32* (2006.01)
*G04B 47/04* (2006.01)

(52) U.S. Cl.
CPC ........... *G04B 19/32* (2013.01); *G04B 47/042* (2013.01); *H05B 45/42* (2020.01)

(56) References Cited

U.S. PATENT DOCUMENTS

| | | | | | |
|---|---|---|---|---|---|
| 5,630,382 | A * | 5/1997 | Barbera | A01K 27/006 362/108 |
| 6,353,579 | B1 * | 3/2002 | Ciervo | G04G 9/0017 368/227 |
| 6,433,483 | B1 * | 8/2002 | Michael | A44C 15/0015 315/307 |
| 6,483,276 | B1 * | 11/2002 | Shimizu | G04C 10/00 310/75 A |
| 6,585,391 | B1 * | 7/2003 | Koch | F21V 23/0464 362/205 |
| 8,366,289 | B2 * | 2/2013 | Zaksenberg | F21L 4/04 362/157 |
| 2002/0141528 | A1 * | 10/2002 | Koike | G04C 10/00 375/376 |
| 2007/0152799 | A1 * | 7/2007 | McDonough | G04F 1/005 340/309.16 |
| 2007/0211578 | A1 * | 9/2007 | Frank | G04B 37/1413 368/316 |
| 2008/0068832 | A1 * | 3/2008 | Spartano | F21V 25/12 362/157 |
| 2008/0168952 | A1 * | 7/2008 | Morehead | A01K 27/006 119/859 |
| 2011/0044031 | A1 * | 2/2011 | Zaksenberg | F21V 33/0004 362/157 |
| 2012/0201049 | A1 * | 8/2012 | Sherman | H02J 50/20 362/602 |
| 2014/0334138 | A1 * | 11/2014 | Jigamian | F21L 4/005 362/157 |
| 2015/0075217 | A1 * | 3/2015 | Disinger | A44C 15/0015 63/1.11 |
| 2015/0223576 | A1 * | 8/2015 | Vora | A44C 15/0015 362/104 |
| 2015/0241848 | A1 * | 8/2015 | Willemin | G02B 6/0001 362/23.16 |
| 2015/0313329 | A1 * | 11/2015 | Flanery | F21V 33/0008 362/104 |
| 2015/0346691 | A1 * | 12/2015 | Tortora | G04B 19/305 368/238 |

FOREIGN PATENT DOCUMENTS

| | | | |
|---|---|---|---|
| CN | 101178056 | A | 5/2008 |
| CN | 101185636 | A | 5/2008 |
| CN | 102681421 | A | 9/2012 |
| CN | 102684645 | A | 9/2012 |
| CN | 103414309 | A | 11/2013 |
| WO | 92/04662 | | 3/1992 |
| WO | 2004021369 | A2 | 11/2004 |

* cited by examiner

MINIATURE USER-POWERED LIGHTING DEVICE, SYSTEM AND METHOD OF USING SAME

CROSS REFERENCE TO RELATED APPLICATIONS

This application is a divisional application of U.S. Ser. No. 15/555,981, filed on Sep. 6, 2017, which claims the benefit of U.S. Provisional Application No. 62/129,154, filed Mar. 6, 2015, the content of the entirety of which is explicitly incorporated herein by reference and relied upon to define features for which protection may be sought hereby as it is believed that the entirety thereof contributes to solving the technical problem underlying the invention, some features that may be mentioned hereunder being of particular importance.

COPYRIGHT & LEGAL NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. Further, no reference to third party patents or articles made herein is to be construed as an admission that the present invention is not entitled to antedate such material by virtue of prior invention.

BACKGROUND OF THE INVENTION

This invention relates to auxiliary powered devices and in particular devices for powering low consumption features of portable instruments such as wrist watches. With electronic or quartz watches, an electric power source exists by which an electric energy consumption element such as a light source, typically a conventional LED, may be activated to illuminate a watch face to facilitate reading time at night. However, mechanical watches do not typically have an electric power source and rely typically on luminescence to enable reading of the watch face at night.

Miniature lighting devices exist which incorporate miniature lighting elements which are illuminated on-demand for a limited duration for backlighting and/or illumination purposes. Such devices however do not provide a trigger for releasing stored mechanical energy.

Other devices, not just lighting devices, can benefit from an ability to trigger their operation for a short duration.

What is needed therefore is a means to trigger the operation of an electric power consuming element for a limited time, such as to illuminate a mechanical watch that does not rely on luminescence or a battery or other electro-chemical storage device.

SUMMARY OF THE INVENTION

A miniature, user-powered portable device for triggering the operation of an electric power consuming element is preferably wearable, employs mechanical energy storage and incorporates miniature special effect elements which are activated on-demand for a limited duration for to backlighting, illumination, or other special effect purposes without the need for a battery or other electro-chemical storage device. The device comprises a manual spring loading mechanism, a spiral spring, a manual trigger mechanism, a transmission for increasing the rotational speed, a miniature generator, and at least one electric power consuming element such as a transmitter or a light source, preferably a light emitting diode.

An object of the invention is to provide a battery-free device which electrical and/or communications functionality.

Another object of the invention is to avoid depletion of energy stored for a principal function such as keeping time, with secondary functions such as lumination, emitting an alarm or sending a signal to a remote device.

Those skilled in the art will appreciate that elements in the figures are illustrated for simplicity and clarity and have not necessarily been drawn to scale. For example, dimensions may be exaggerated relative to other elements to help improve understanding of the invention and its embodiments. Furthermore, when the terms 'first', 'second', and the like are used herein, their use is intended for distinguishing between similar elements and not necessarily for describing a sequential or chronological order. Moreover, relative terms like 'front', 'back', 'top' and 'bottom', and the like in the description and/or in the claims are not necessarily used for describing exclusive relative position. Those skilled in the art will therefore understand that such terms may be interchangeable with other terms, and that the embodiments described herein are capable of operating in other orientations than those explicitly illustrated or otherwise described.

DETAILED DESCRIPTION OF THE PREFERRED EMBODIMENT

The following description is not intended to limit the scope of the invention in any way as they are exemplary in nature and serve to describe the best mode of the invention known to the inventors as of the filing date hereof. Consequently, changes may be made in the arrangement and/or function of any of the elements described in the disclosed exemplary embodiments without departing from the spirit and scope of the invention.

Figure 1:
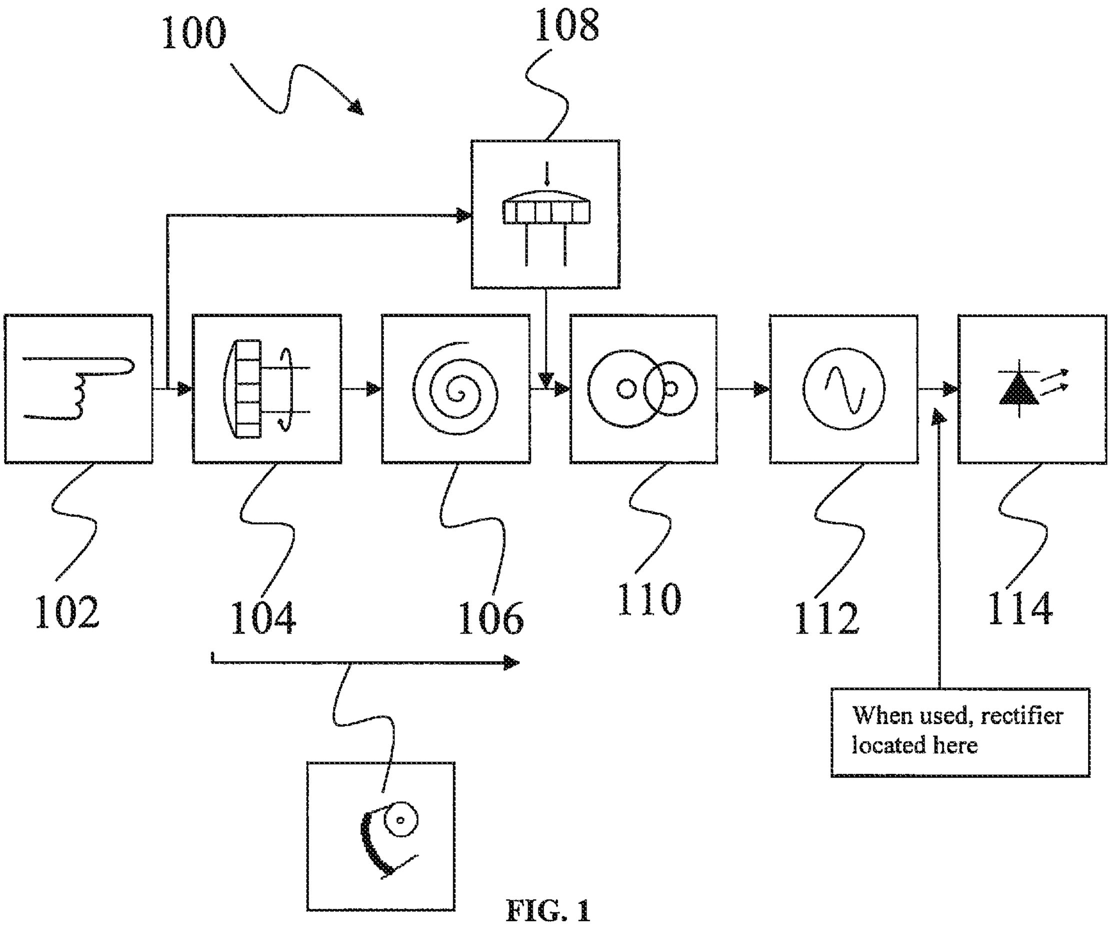
FIG. 1 is a block diagram of the system of the present invention.

Referring now to FIG. 1, the system 100 of the present invention includes several components that interact with one another and user 102. User 102 energizes spring loading mechanism 104 by winding the mechanism via the winding knob 104. Spring loading mechanism 104 actuates a subsystem which includes spring 106, push button 108 and transmission 110. Transmission 110 then energizes miniature electrical energy generator 112 as e.g. model number MG4.0 (drawing 110.P01.1), available at Kinetron B. V. in Tilburg, Netherlands (described in U.S. Pat. No. 5,923,619, particularly beginning col. 3, line 21 to col. 7, line 47, and the corresponding drawing figures) but other generators such as those described in Japanese patent publication JP-A-53026169, JP-A-52 067365, CH-A-334720 and European Patent EP 0170303 A, the contents of which, including the Kinetron patent, are incorporated herein by reference thereto and relied upon, may be used. Miniature electrical energy generator 112 then supplies electrical power to a special effects element such as a lighting element 114, e.g. LED, incandescent, LEC (light-emitting electrochemical cell), and laser diodes. Note however, the invention should not be considered as limited to lighting elements. Any number of special effects elements may be triggered by the device of the invention.

When the special effect element is a light source or sources, such light source(s) may distribute light to desired locations via fiber optics, wave guides, and light diffusion in glass or plastic components be they transparent, colored or translucent (such as shown in U.S. Pat. No. 8,488,418B2, particularly in relation to FIGS. 3B and 3C and the corresponding text, in U.S. Pat. No. 7,063,429 B2 and US20100170115A1, the contents of which are incorporated herein by reference and relied upon).

Figure 2:
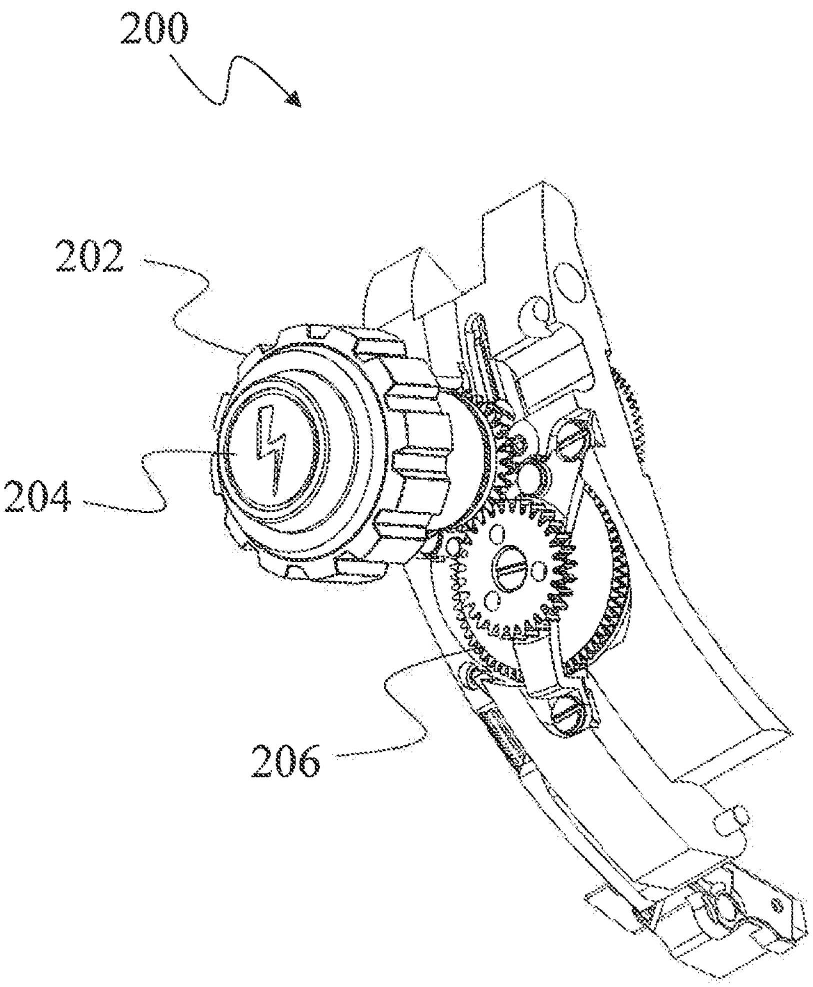
FIG. 2 is a front-side schematic view of a device of the present invention.
Figure 3:
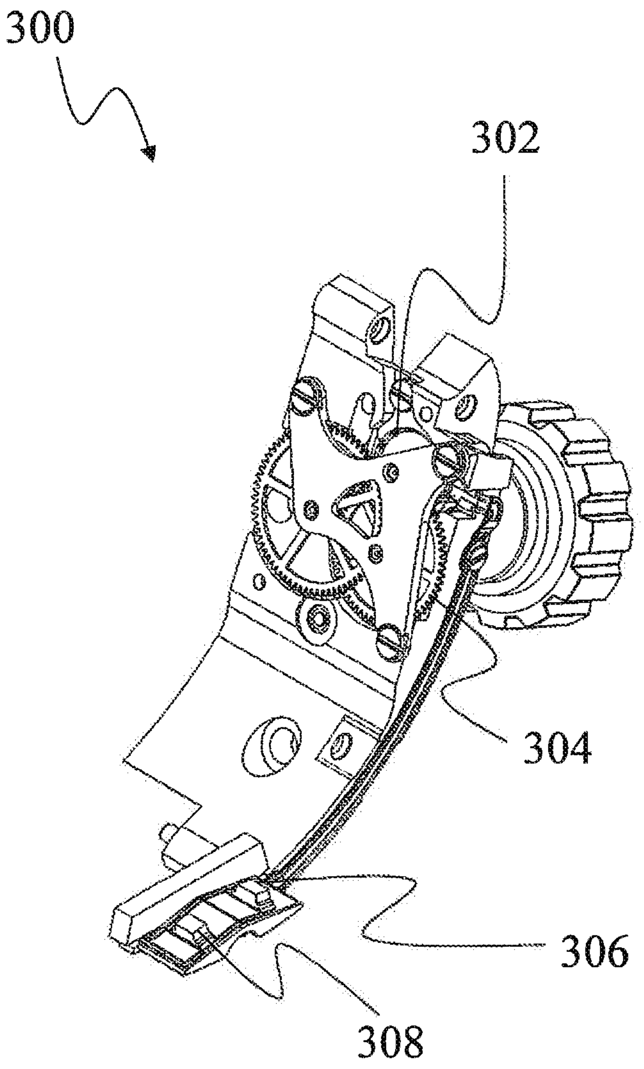
FIG. 3 is a back-side schematic view of the device of the present invention.

Referring now to FIGS. 2 and 3, a miniature, user-powered lighting device 200, 300 employs mechanical energy storage via the sub-systems described above, and incorporates miniature electricity consuming elements 114 in one embodiment are light sources which are illuminated on-demand for a limited duration for backlighting or illumination purposes without the need for a battery or other electro-chemical storage device in a watch or watch housing (although the description describes a watch other variants of the invention which include other compact user worn devices as well as other energy consuming elements other than light sources can be used). The devices 200, 300 include sub-systems that have a manual spring loading mechanism 202, a spring 206, and a manual trigger mechanism 204. As shown in FIG. 3, the transmission 304 is provided for increasing a rotational speed of other components of the sub-system and is mechanically coupled to a miniature generator 302 for generation of electrical energy. Generator 302 generates electrical energy and then energizes any suitable electric energy consumption device, in one embodiment, one or more light emitting diodes 306 and 308 (FIG. 3).

In a sub-system, the manual spring loading mechanism 202 is mechanically coupled to the spring 206. The spring 206 is released by a user 102 via the manual trigger mechanism 204 to actuate the at least one electricity consuming effect element such as a light-emitting diode 306 or 308. The generator 112, in another variant of the invention, may also energize other electricity consuming effect elements, e.g. GPS circuitry, screens, sensors, etc. The spring 206 is coupled to the transmission 304 which is in turn coupled to the miniature generator 302. The miniature generator 302 is electrically coupled via one or more circuitry sub-systems to the one or more effect elements such as light emitting diodes 306 and 308. The electrical output of generator 112 (and the miniature generator 302 illustrated in FIG. 3) provides sufficient electrical energy to activate the at least one or more electricity consuming effect elements such as light emitting diodes 306 and 308 for a time out period or a pre-set or limited amount of time, until mechanical actuation or loading is again provided.

In one variant of the invention, the spring 106 includes a spiral spring (of course other types of springs are also used in other variants of the invention). The spring loading mechanism 104 is a watch winding knob or crown (FIGS. 2, 3 and 4) but may, for example, be a lever coupled to a rotational mechanism (shown schematically as an alternate feature to feature 106 in FIG. 1). The lever is, for example, a cantilever spring which is deflected by the user to store energy, the end of which is attached to a rotational mechanism such as a pulley which is biased to wind up when the lever is depressed, the rotational mechanism locking at a maximum deflected position via, for example, a ratchet releasable at will by the user to release energy which is then input into the generator. The spiral spring is disposed in the watch housing, and is sized and dimensioned to be located with a spring barrel. In another embodiment, the manual trigger mechanism is a push-button 108. In yet other variants, the button 108 and watch crown are one in the same component.

Figure 4:
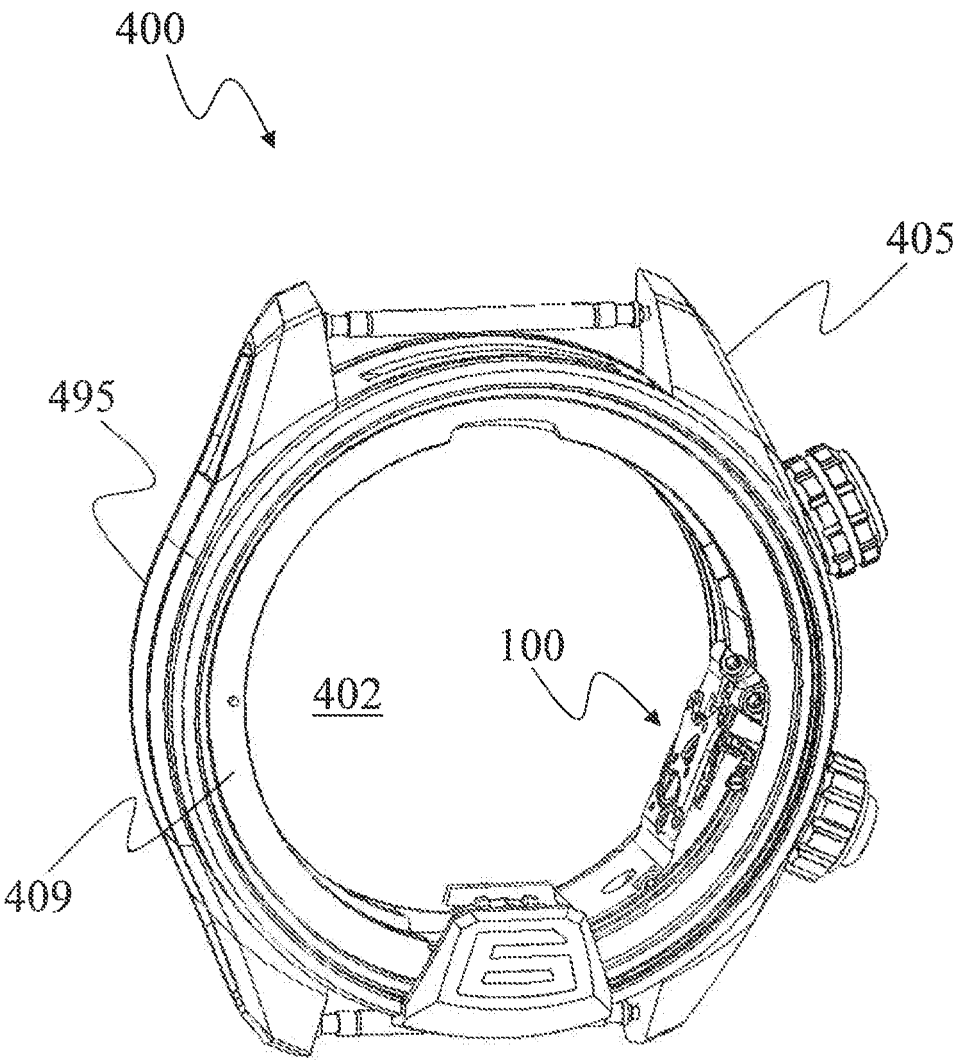
FIG. 4 is a schematic top perspective view of the device integrated into a watch housing.

Referring now to FIG. 4, the device 100 is incorporated into a timepiece 400, e.g. a wrist watch. The device 100 illuminates the watch face 402. In other variants, the light sources (e.g., LEDS) are located on other portions of the watch housing 405 and the light is conducted to a desired location by optical fibers or the like, as mentioned above The watch housing includes an upper surface portion 409 which is disposed on a unitary housing 495.

The light source 306, 308 (FIG. 3) may be replaced or supplemented with additional light sources disposed at any interior location within the housing 405, either on the upper portion 409 or on the lower portion 495, both portions or any location therebetween, even on a wrist watch band as desired. The housing optionally includes an electrical connector port (not shown) into which a mating plug inserts for feeding electrical energy to another device connected to the system by, for example, a removable cable tether (not shown).

Figure 5:
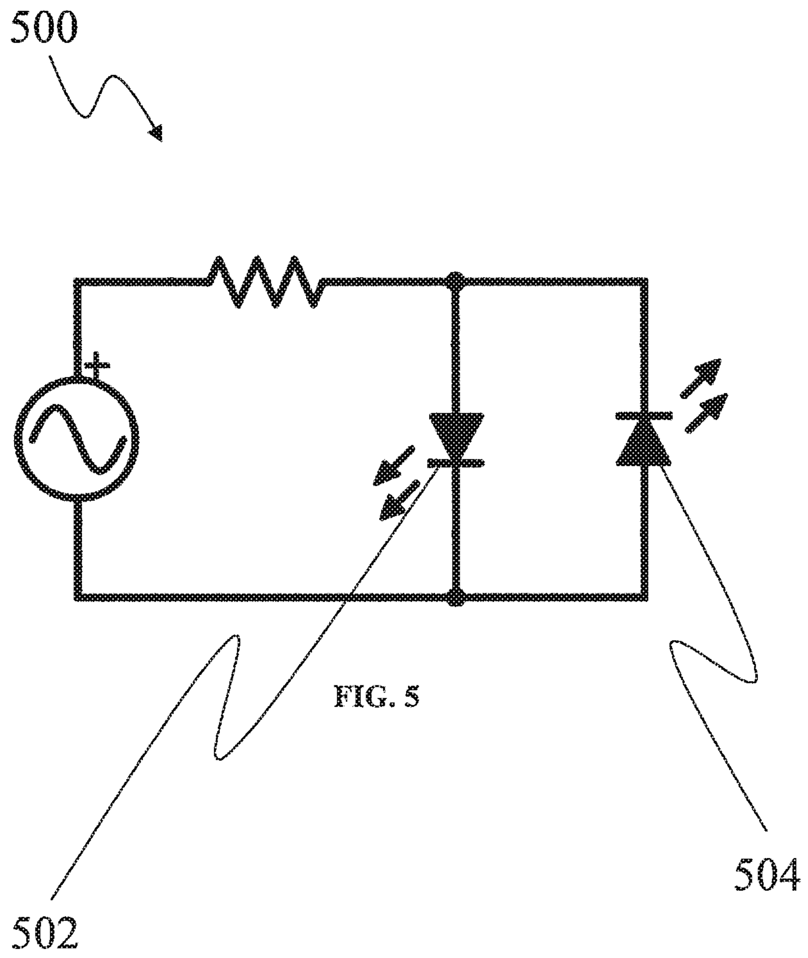
FIG. 5 is a basic electrical circuit diagram used in the present invention.

In one variant, the miniature generator 112 produces an alternating current, enabling continuous lighting of optical fibers as described in DE102005063208A1, the content of which is incorporated herein by reference thereto. Further, changing of the color emitted by the light sources is possible as well. Referring now to FIG. 5, light sources 306, 308 are connected in parallel in opposing senses such that positive components of an electrical signal illuminate one diode 502 and negative components of the electrical signal illuminate the other diode 504. In another variant, the miniature generator 112 produces a direct current, and/or a second separate (or more) miniature generator produces an alternating current. Here, an electronic rectifier is incorporated between the miniature generator 112 and the light emitting diode or diodes 306, 308 to convert the alternating current to direct current.

Figure 6:
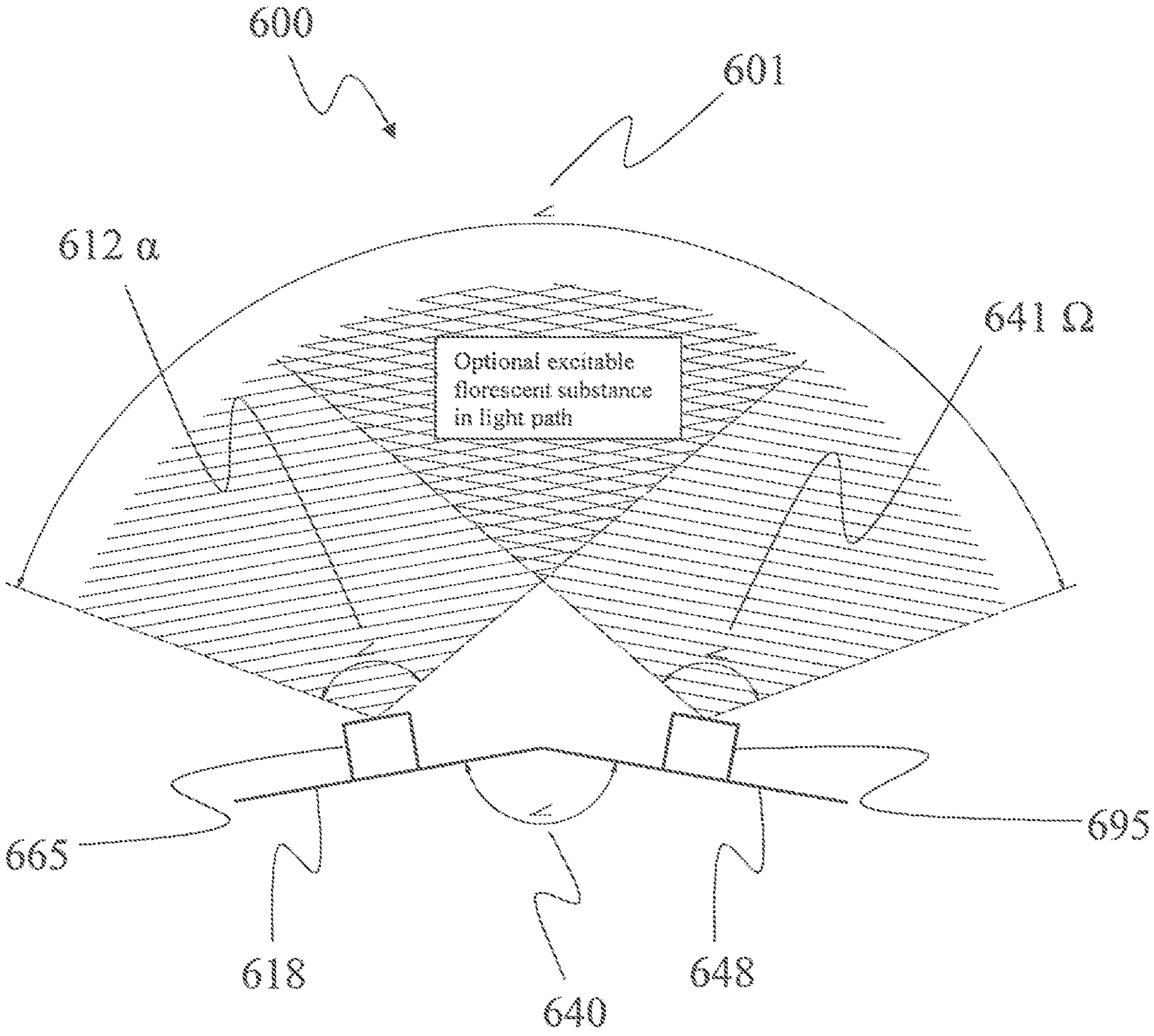
FIG. 6 is an illustration of illumination angles used in the present invention where the special effect element is a light source.

Referring now to FIG. 6, the fields of illumination of the system of the invention is described in which the at least two light sources 665, 695 are arranged on planes 618, 648 at a non-zero angle $\infty$ 640 with respect to each other. Light source 665 illuminates through angle $\alpha$ 612. Light source 695 illuminates through an angle $\Omega$ 641. The sum of die illuminate of angle $\alpha$ 612 and angle $\Omega$ 641, together, provide a larger field of illumination 601 than the individual parts.

In another variant, the lighting elements 306, 308 emit light of a frequency which excites a fluorescent substance within one or more tubes or at specific locations within the watch housing 405. It is appreciated that due to excitation of the fluorescent substance, visibility of the indicators on the watch 400 is increased from the perspective of a user's eyes.

In a further variant, the invention provides a complete, functional wristwatch comprising the device 100 described herein. In another variant, a compact user worn item of jewelry may also include the device described herein. The jewelry includes a housing of a precious metal, optionally gold or platinum, and precious gems, optionally diamonds or rubies, for ornamentation. A jewelry matching system includes one or more related matching and coordinated jewelry items other than the compact user worn item of jewelry. In one variant, a system of personal accessories is also provided (not shown), e.g. necklace, pendant, rings, and ear rings. The system includes the wristwatch of the invention described herein, a wired or wireless energy transferring sub-system, the sub-system optionally including a device remote from the wristwatch, the device remote from the wristwatch being triggered via one way communication emanating from the wristwatch. The special effect element may also include micromotors which trigger a mechanical or electro-mechanical animation on demand of the user, such as provided by the watch manufacturer, Van Cleef & Arpel (animations sur demande). Here, an animation may be executed by one or more electric motors animating a mechanical system. For example, in another embodiment, an animation may be triggered by the invention, such as described in FIGS. 6C, 6D, and 6E of PCT/IB2015/001336, filed 6 Aug. 2015 (and the descriptive text which refers to these figures), the content of which is incorporated herein by reference thereto and relied upon.

Another special effect element may be a sound producing device such as a speaker which produces, for example an alarm or music. Alternatively, the special effect element may produce a signal which is transmitted by a transmitter in the device of the invention and received by a receiver in an external device such as an alarm or speaker and which triggers the external device. The transmitter/receiver may be replaced by a wire where wireless communication is not used. In this embodiment, a transmitter, as the special effect element, is energized by the generator, either directly or indirectly through a circuit optionally having processing elements such as a converter, inverter or rectifier. Upon receipt of a triggering signal from the device of the invention, the external device takes a prescribed action.

Other embodiments are shown and described in appendices attached to the priority filings, which is incorporated herein in this written description. Further, this application incorporates by reference the contents of PCT Appl. No. PCT/IB2010/002054 of the same applicant, entitled FLUID INDICATOR, filed on the 20 Aug. 2010, the contents of which are incorporated herein by reference thereto and relied upon.

In an advantage, the invention provides a battery-free device which electrical and/or communications functionality.

In another advantage, the invention avoids depletion of energy stored for a principal function such as keeping time, with secondary functions such as lamination, emitting an alarm or sending a signal to a remote device.

It should be appreciated that the particular implementations shown and described herein are representative of the invention and its best mode and are not intended to limit the scope of the present invention in any way. Furthermore, any connecting lines shown in the various figures contained herein are intended to represent exemplary functional relationships and/or physical couplings between various elements. It should be noted that many alternative or additional physical connections or functional relationships may be present and apparent to someone of ordinary skill in the field.

Moreover, the apparatus, system and/or method contemplates the use, sale and/or distribution of any goods, services or information having similar functionality described herein.

The specification and figures are to be considered in an illustrative manner, rather than a restrictive one and all modifications described herein are intended to be included within the scope of the invention claimed, even if such is not specifically claimed at the filing of the application. Accordingly, the scope of the invention should be determined by the claims appended hereto or later amended or added, and their legal equivalents rather than by merely the examples described above. For instance, steps recited in any method or process claims should be construed as being executable in any order and are not limited to the specific order presented in any claim. Further, the elements and/or components recited in any apparatus claims may be assembled or otherwise operationally configured in a variety of permutations to produce substantially the same result as the present invention. Consequently, the invention is not limited to the specific configuration recited in the claims.

Benefits, other advantages and solutions mentioned herein are not to be construed as necessary, critical, or essential features or components of any or all the claims.

As used herein, the terms "comprises", "comprising", or any variation thereof, are intended to refer to a non-exclusive listing of elements, such that any process, method, article, composition or apparatus of the invention that comprises a list of elements does not include only those elements recited, but may also include other elements described in this specification. The use of the term "consisting" or "consisting of" or "consisting essentially of" is not intended to limit the scope of the invention to the enumerated elements named thereafter, unless otherwise indicated. Other combinations and/or modifications of the above-described elements, materials or structures used in the practice of the present invention may be varied or otherwise adapted by the skilled artisan to other design without departing from the general principles of the invention.

The patents and articles mentioned above are hereby incorporated by reference herein, unless otherwise noted, to the extent that the same are not inconsistent with this disclosure. Other characteristics and modes of execution of the invention are described in the appended claims. Further, the invention should be considered as comprising all possible combinations of every feature described in the instant specification, appended claims, and/or drawing figures which may be considered new, inventive and industrially applicable.

Multiple variations and modifications are possible in the embodiments of the invention described here. Although certain illustrative embodiments of the invention have been shown and described here, a wide range of modifications, changes, and substitutions is contemplated in the foregoing disclosure. While the above description contains many specifics, these should not be construed as limitations on the scope of the invention, but rather as exemplifications of one or another preferred embodiment thereof. In some instances, some features of the present invention may be employed without a corresponding use of the other features. In addition, the term "flexible" as used herein encompasses the concept of variable, in that a variable volume reservoir should be considered a flexible chamber, even if no individual components flex. Accordingly, it is appropriate that the foregoing description be construed broadly and understood as being given by way of illustration and example only, the spirit and scope of the invention being limited only by the claims which ultimately issue in this application.

What is claimed is:

1. A jewelry item that is not a mechanical watch, the jewelry item adapted to illuminate, absent need of any battery, capacitor or other electro-chemical storage device, a portion of the jewelry item, the jewelry item further having an elongated portion which extends around an appendage of a living organism so as to be wearable thereon and adapted to store and release energy stored mechanically and provided by a user and activated on demand for a limited duration, and selected from the group of jewelry items consisting of a necklace, a pendant, a ring and an ear ring, wherein the jewelry item incorporates:

a) a manual spring loading mechanism (re) having a crown and chargeable by the user to store energy provided by the user and mechanically coupled to a spring, b) a manual trigger mechanism wherein an actuator of the manual trigger mechanism is located coaxially to the crown of the manual spring loading mechanism and adapted to enable release of the stored energy, c) a transmission, d) a miniature rotary generator activated for a limited duration on demand by the manual trigger mechanism, and e) one or more special effect elements, wherein the transmission is mechanically coupled to the spring and the miniature rotary generator for increasing rotational speed, wherein the one or more special effect elements are electrically coupled to the miniature rotary generator to provide a special effect, wherein the spring is released by the user via the manual trigger mechanism to actuate the one or more special effect elements, wherein the miniature rotary generator provides electrical energy to activate the jewelry item for a given time period, and wherein at least one of the one or more special effect elements is at least one light source.

2. The jewelry item of claim 1, wherein the at least one of the at least one light source is selected from one of a group of light sources consisting of incandescent, LEC (light-emitting electrochemical cell), LED, laser diodes, and IR LEDs.

3. The jewelry item according to claim 1, in which the loading mechanism is a crown and barrel combination.

4. The jewelry item according to claim 1, in which the loading mechanism is a lever coupled to a rotational mechanism.

5. The jewelry item according to claim 1, in which the spring is a spiral spring and is contained in a spring barrel.

6. The jewelry item according to claim 1, in which the manual trigger mechanism is a push-button.

7. The jewelry item according to claim 1, in which the manual trigger mechanism is integrated in a crown of the jewelry item or is comprised in the crown of the jewelry item.

8. The jewelry item of claim 1, wherein the device is a watch, whereby the light source illuminates the watch face to increase visibility of components of the watch.

9. The jewelry item according to claim 1, having at least two or more light sources.

10. The jewelry item according to claim 2, further comprising electrical circuitry, the miniature rotary generator adapted to generate an alternating current and wherein the jewelry item has at least two light sources which are light emitting diodes connected in parallel in opposing senses such that positive components of an electrical signal illuminate one diode and negative components of the electrical signal illuminate the other diode.

11. The jewelry item according to claim 1, in which the miniature rotary generator produces a direct current.

12. The jewelry item according to claim 1, wherein the miniature rotary generator produces an alternating current.

13. The jewelry item of claim 12, wherein an electronic rectifier is incorporated between the miniature rotary generator and the light source to convert the alternating current to direct current.

14. The jewelry item according to claim 9, in which the at least two or more fixed light sources are light emitting diodes arranged on planes at a non-zero angle with respect to each other, providing an overall angle of illumination greater than that of the one single light emitting diode.

15. The jewelry item according to claim 2, in which the lighting elements emit light of a frequency so as to excite a fluorescent substance, whereby a visibility of the fluorescent substance is increased.

16. A system of personal accessories comprising: the jewelry item of claim 1 and an external device, the jewelry item being communicatively connectable with the external device remote from the jewelry item which is energized upon receipt of a triggering signal from the jewelry item so as to activate a special effect in the external device.

17. The jewelry item of claim 1 further comprising one or more components and/or indicators electrically energized by the miniature rotary generator.

18. The jewelry item of claim 1 wherein light is distributed via a light distribution means selected from one of the group of light distribution means consisting of fiber optics, wave guides, and light diffusion in glass or plastic components.

19. A jewelry item that is not a mechanical watch, the jewelry item adapted to generate special effects, absent need of any battery, capacitor, or other electro-chemical storage device, the jewelry item further having an elongated portion which extends around an appendage of a living organism so as to be wearable thereon, wherein the jewelry item is adapted for storing and releasing energy stored mechanically and provided by a user and is activated on demand for a limited duration and wherein the jewelry item being selected from the group of jewelry items consisting of a necklace, a pendant, a ring and an ear ring, the jewelry item incorporating:

a) a manual spring loading mechanism having a crown located coaxially to the manual spring loading mechanism and (re)chargeable by the user to store energy provided by the user and mechanically coupled to a spring, b) a manual trigger mechanism wherein an actuator of the manual trigger mechanism is located coaxially to the crown of the manual spring loading mechanism and adapted to enable release of the stored energy, c) a transmission, d) a miniature rotary generator activated on demand for a limited duration by the manual trigger mechanism, and e) one or more special effect elements, wherein the transmission is mechanically coupled to the spring and the miniature rotary generator for increasing rotational speed, wherein the one or more special effect elements are electrically coupled to the miniature rotary generator to provide a special effect, wherein the spring is released by the user via the manual trigger mechanism to actuate the one or more special effect elements, wherein the miniature rotary generator provides electrical energy to activate the jewelry item for a given time period, and wherein at least one of the one or more special effect elements is at least one light source.

20. The jewelry item of claim 19 adapted for illuminating a gemstone.

* * * * *